Patented Feb. 6, 1934

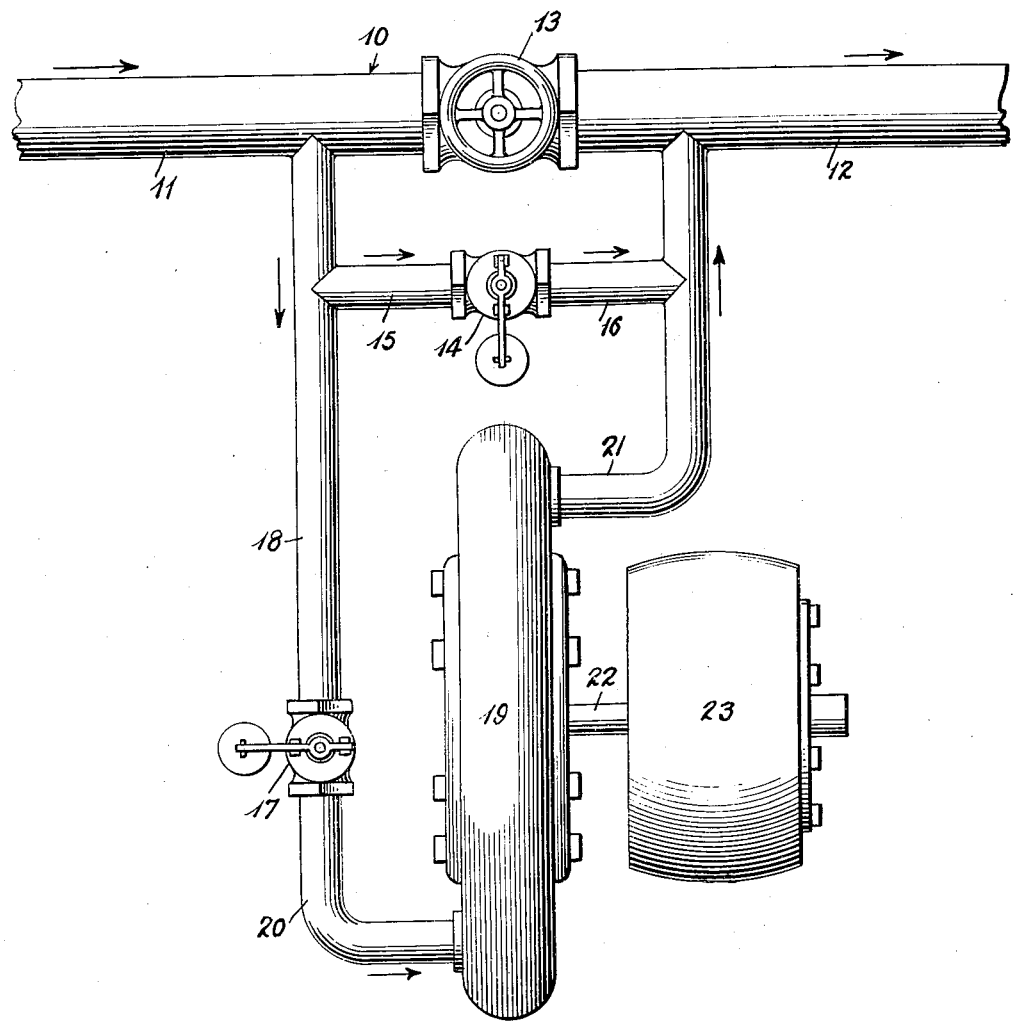

1,946,182

UNITED STATES PATENT OFFICE 1,946,182

APPARATUS AND METHOD OF UTILIZING ENERGY NORMALLY WASTED IN REDUCING THE PRESSURE OF FLUIDS

Charles Sherman Thompson, State Line, Pa., assignor to The Manufacturers Light and Heat Company, Pittsburgh, Pa., a corporation of Pennsylvania Application July 14, 1933. Serial No. 680,454

2 Claims. (Cl. 253—36)

This invention relates to an apparatus and method of utilizing the energy of fluids under pressure which energy is normally wasted when the pressure in fluid mains is reduced before delivery to outlet mains. For example, gas is frequently stored at pressures greatly in excess of that desirable in distribution mains or is received from natural gas wells at excessive pressures. When the pressure of this fluid is reduced to a proper pressure for the outlet mains a very large loss of energy occurs and it is an object of this invention to transform at least a portion of this wasted energy into usable energy preferably in the form of electrical energy.

Another object of the invention is to provide an apparatus and method of utilizing the wasted energy of fluid pressure reduction devices whereby the pressure in the outlet conduits is maintained substantially constant.

A further object of the invention is to provide an apparatus and method of using the wasted energy of fluid pressure reduction devices wherein the amount of energy converted into useful energy may be maintained substantially constant irrespective of fluctuations of the demand upon the outlet mains.

A still further object of the invention is to provide a relatively simple and inexpensive apparatus for converting the wasted energy of gas pressure reduction apparatus of commercial gas distributing plants into useful electrical energy for lighting systems, charging storage batteries, power devices, etc.

Other objects and advantages of the invention will appear in the following description of the preferred embodiment of the invention shown in the attached drawing of which;

The figure is a diagrammatic sketch illustrating one form of the invention.

Referring more particularly to the drawing, 10 represents a gas main having an inlet portion 11 and an outlet portion 12. A gate valve 13 in the gas main 10 is positioned between the inlet and outlet portion of the main and in normal operation of the device is maintained in a closed position. An automatic pressure reducing valve 14 is connected in the inlet main 11 by pipes 15 and 18 and to the outlet main by pipes 16 and 21. The pressure reducing valve 14 is made responsive to the gas pressure in the outlet main 12 or pipe 16 and operates to maintain the pressure in the outlet main 12 substantially constant at a predetermined pressure which is below that of the main 11, irrespective of the demand upon main 12 or fluctuations of pressure in main 11.

A second automatic pressure regulator 17 is connected to main 11 through pipe 18 and to the inlet of a gas turbine 19 by pipe 20. The pressure regulator 17 is made responsive to gas pressure in pipe 20 and operates to maintain the gas pressure in pipe 20 at a predetermined pressure above that in outlet main 12. Gas turbine 19 exhausts through the pipe 21 to the outlet main 12. Since the gas pressure in pipe 20 is maintained at a predetermined pressure above that in outlet main 12 the difference in gas pressures is effective to drive the gas turbine 19 to produce useful mechanical energy and as the difference in gas pressures is maintained substantially contant the power supplied by the turbine is substantially constant under normal operating conditions. The turbine 19 may be connected by a shaft 22 to drive an electrical generator 23 and the electrical power produced thereby utilized as a source of power for charging batteries, supplying lighting circuits, etc.

It will be noted that when the demand is light upon main 12, the pressure therein will tend to rise, and pressure regulator 14 will restrict the flow of gas through pipes 15 and 16 and all or the major portion of the gas entering main 12 will flow through the turbine 19. On the other hand, when the demand upon main 12 becomes heavy the pressure therein will tend to fall, pressure regulator 14 will permit a greater portion of the gas to flow through pipes 15 and 16 while the amount of gas flowing through the turbine will be substantially the same as under light demand conditions. This is true since pressure regulator 17 always tends to maintain a constant pressure in the pipe 20, supplying the turbine which is greater than the constant pressure in outlet main 12. It is to be noted that, if the conditions at a particular installation are such that the pressure in inlet main 11 remains substantially constant, irrespective of the demand upon outlet main 12 and changes in the amount of gas flowing through pressure regulator 14, the pressure regulator 17 may be omitted or replaced with a fitting having a fixed orifice.

It is further to be noted that if a constant output from the turbine is desired a turbine for any particular installation should be selected such that its full power will be developed under conditions of minimum demand upon outlet main 12 and which has a normal operating pressure not greater than the minimum pressure differential between inlet main 11 and outlet main 12. If constant output is not required a larger turbine may be utilized in which case the output of the turbine will be less than its normal output under conditions of minimum demand upon main 12 or under conditions in which the pressure differential between mains 11 and 12 drops below the normal operating pressure of the turbine.

As an example of the particular installation a turbine D. C. generator set was installed to utilize a portion of the wasted energy due to the reduction of the gas pressure in an eight inch main from approximately 175 lbs/in$^2$ to 90 lbs/in$^2$. A pressure regulator 14 was adjusted to maintain 90 lbs/in$^2$ in the outlet main. A turbine operating with a normal pressure differential of 25 lbs/in$^2$ and directly driving a D. C. generator developing 1.5 k. w. was connected to the inlet and outlet means in series with a pressure regulator adjusted to maintain a pressure of 115 lbs/in$^2$ at the inlet of the turbine and operated to produce a substantially constant output irrespective of variations in demand upon the outlet main and pressure variations in the inlet main.

While I have described and shown a preferred embodiment of my invention it is to be understood that changes and variations may be made within the scope of the following claims.

Having thus described my invention, I claim:

1. In a device for reducing the pressure in a gas main and converting at least a portion of the normally wasted energy into useful energy, an inlet main connected to a source of gas at a relatively high pressure, an outlet main, a pressure regulator responsive to the pressure in said outlet main and connected to receive gas from said inlet main and to deliver said gas to said outlet main at a substantially constant pressure which is lower than the pressure in the inlet main, a gas turbine connected to receive gas from said inlet main and to discharge into said outlet main, a second pressure regulator responsive to the pressure of the gas entering said turbine connected between said inlet main and said turbine for delivering gas to said turbine at a predetermined pressure above that of the gas in said outlet main.

2. In a device for reducing the pressure of gas and converting at least a portion of the normally wasted energy into useful energy, a source of gas at a relatively high pressure, an outlet pipe, a pressure regulator responsive to the pressure in said outlet pipe and connected to receive gas from said source and to deliver said gas to said outlet pipe at a substantially constant pressure lower than the pressure of said source, a gas turbine connected to receive gas from said source and to discharge into said outlet pipe, a second pressure regulator responsive to the pressure of the gas entering said turbine, connected between said source and said turbine, for delivering gas to said turbine at a predetermined pressure above that of the gas in said outlet main.

CHARLES SHERMAN THOMPSON.